United States Patent [19]
Mitomi et al.

[11] Patent Number: 5,790,719
[45] Date of Patent: Aug. 4, 1998

[54] OPTICAL CONTROL DEVICE

[75] Inventors: Osamu Mitomi; Hiroshi Miyazawa, both of Isehara; Kazuto Noguchi, Atsugi, all of Japan

[73] Assignee: Nippon Telegraph and Telephone Corporation, Tokyo, Japan

[21] Appl. No.: 757,627

[22] Filed: Nov. 27, 1996

[30] Foreign Application Priority Data

Nov. 28, 1995 [JP] Japan .................................. 7-308937
May 22, 1996 [JP] Japan .................................. 8-127240

[51] Int. Cl.$^6$ ........................................ G02B 6/10
[52] U.S. Cl. ................................... 385/2; 385/9
[58] Field of Search .......................... 385/2, 3, 8, 9, 385/10

[56] References Cited

U.S. PATENT DOCUMENTS 5,129,017  7/1992  Kawano et al. ........................ 385/2
5,220,627  6/1993  Kawano et al. ........................ 385/2
5,422,966  6/1995  Gopalakrishnan et al. ............. 385/2

FOREIGN PATENT DOCUMENTS

0388637A1   9/1990  European Pat. Off. .
3-229214   10/1991  Japan .
4-288518A  10/1992  Japan .
08166566A   6/1996  Japan .

Primary Examiner—John Ngo
Attorney, Agent, or Firm—Spencer & Frank

[57] ABSTRACT

An optical control device include a substrate having an electrooptic effect, the substrate having ridges with optical waveguides. A buffer layer is formed on the substrate surface, and electrodes are provided. The electrodes includes at least one ground electrode, and a central electrode that is formed on the buffer layer over a ridge. The width of the central electrode on the side where the central electrode contacts the buffer layer is larger than the width of the optical waveguide. Because of this construction, the optical control device can achieve constant characteristics and a broad bandwidth.

18 Claims, 12 Drawing Sheets

OPTICAL CONTROL DEVICE

BACKGROUND OF THE INVENTION

1. Field of the Invention

This invention relates to an optical control device such as an optical switch.

2. Description of the Prior Art

Optical communication systems and optical measuring technologies widely use optical control devices, such as optical modulators, optical switches or polarization controllers, which perform optical modulation, optical switching or polarization control based on electric signals by use of ferroelectric materials having an electrooptic effect, such as lithium niobate ($LiNbO_3$: LN) crystals.

FIGS. 1 and 2 show an example of a conventional traveling-wave type high speed optical intensity modulator with the broadest bandwidth which we, the inventors, have researched and developed using LN crystals. FIG. 1 is a top view of the optical modulator using coplanar waveguide type modulating electrodes. FIG. 2 is a sectional view of a central part of the modulator. In this example, cores 102 constituting Mach-Zehnder type optical waveguides are formed by Ti thermal diffusion in a z-cut LN substrate 101 having an electro-optic effect. The surroundings of each core 102 have a ridge structure dug several micrometers deep. On the substrate 101, a buffer layer 103 having a thickness $t_b$ (concurrently functioning as a cladding layer of the optical waveguide) and 103 comprising a dielectric such as $SiO_2$ is formed for suppressing the propagation loss of light caused by modulating electrodes. On the buffer layer 103, coplanar waveguide modulating electrodes are formed comprising a central electrode 104 and ground electrodes 105 composed of Au or Al.

With this conventional modulator, the velocity of the modulating microwave signal and the velocity of the guided light wave do not necessarily match each other. The operating bandwidth of the modulator is mainly limited by this velocity-mismatch between the microwave and the light wave. Let the effective index of the electrode for the modulating microwave signal be $n_m$, and the effective index of the optical waveguide be $n_o$ ($n_o=2.15$ in the wavelength $\lambda=1.55$ μm band). Under impedance-matching conditions, the bandwidth of the optical modulator (electrical 3 dB), $\Delta f_1$, is known to be given by $$\Delta f_1 = 1.4c/(\pi |n_m - n_o| L) \quad (1)$$

where c is the velocity of light in vacuum, and L is the interaction length of the modulating electrodes. The magnitude of the driving voltage, $V\pi$, of the modulator is inversely proportional to the length, L, of the modulating electrode. Thus, in order to broaden the bandwidth without increasing the driving voltage, based on the relationship of equation (1), the electrode thickness $t_m$, the buffer layer thickness $t_b$, the interelectrode gap G, the central electrode width W and the ridge depth $t_r$ are set so that the magnitude of $n_m$ will be close to the magnitude of $n_o$.

Simultaneously, the above parameters must be set so that the characteristic impedance of the modulating electrodes will be 50Ω, and match the impedance of the external circuit.

By taking these measures, we have broadened the operating bandwidth of the optical control device up to 70 GHz.

In FIG. 2, the widths of the central electrode and the ground electrodes are small on the side where these electrodes contact the buffer layer. The reason is as follows: To bring the velocity of the modulating microwave signal close to the velocity of light propagating through the optical waveguide, it is necessary to set the electrode thickness $t_m$ to be comparable to the interelectrode gap G (normally, 10 to 50 μm). Consequently, the central electrode and the ground electrodes will thicken considerably. For this purpose, these electrodes are formed by electroplating using a thick film resist pattern as a guide. The shape of the resist becomes trapezoidal (the nearer the resist is to the substrate, the larger its width is), so that the central electrode and the ground electrodes are narrower on the side where these electrodes contact the buffer layer as illustrated in FIG. 2.

In this case, it matters how to define the width of the electrode, since the characteristics of an optical control device are dependent mainly on its width on the side where it contacts the buffer layer. Thus, the dimensions for electrode width which are used in the specification and drawings of the instant application are to be the dimensions on the side of contact with the buffer layer.

In FIGS. 1 and 2, the surface of the buffer layer 103 is not flattened. Because of this, lines of electric force for microwaves occupy more space filled with air with a lower refractive index, thus making it easier to approach for $n_m$ to approach to $n_o$.

In principle, the characteristic impedance of the optical control device should be equated with the characteristic impedance of the external circuit (normally, 50Ω). However, a device with small characteristic impedance may be used, in order to drive the optical control device with a lower voltage. In this case, as the frequency bandwidth narrows, reflected waves occur. The reflected waves are removed by an isolator to prevent operating instability of the driving signal source. In this case, the characteristic impedance of the optical control device is set at a desired value, say, 40Ω, or less so that the required performance can be obtained in consideration of the effect of lowering the driving voltage and the effect of narrowing the bandwidth.

The device of FIGS. 1 and 2 incorporating the foregoing means of achieving a broad bandwidth still involves unresolved problems. We have found this fact during our research and development efforts for broadening the bandwidth of the device.

That is, the production of the device in FIGS. 1 and 2 does not always realize such high performance. The operating bandwidth, the driving voltage, and the characteristic impedance fail to be constant for the respective devices produced.

According to equation (1), moreover, if $n_m$ and $n_o$ are identical, the bandwidth should be infinite. However, even if $n_m$ and $n_o$ are brought close to each other within a certain range of values, the bandwidth does not widen any longer.

SUMMARY OF THE INVENTION

The object of the present invention is to make the characteristics of an optical control device constant as a first step, and then, to go beyond the above-described limits of bandwidth.

To attain this object, the present invention concerns an optical control device comprising a substrate having an electrooptic effect and having, formed therein, ridges including optical waveguides; a buffer layer formed on the substrate; and electrodes consisting of ground electrodes formed on the substrate via the buffer layer, and a central electrode formed on the ridge via the buffer layer; the surface of the buffer layer formed in the portions other than the ridges being formed to be lower than the surface of the buffer layer formed on the ridges; and the width and depth of the ridge, the thickness of the buffer layer, and the shapes and dimensions of the electrodes being set so that the microwave loss of the electrodes will be decreased, the velocity of microwaves propagating in the electrodes and the velocity of light propagating through the optical waveguides will exactly or nearly match each other, and the impedance of the electrodes will exactly or nearly match a desired impedance; wherein the width of the central electrode on the side where the central electrode contacts the buffer layer is larger than the width of the core of the optical waveguide.

Hereinabove, the desired impedance may be the characteristic impedance of an external circuit.

In the above construction, the width of the central electrode on the side where the central electrode contacts the buffer layer may be larger than the average of the width of the ridge and the width of the core in the optical waveguide. Further, the width of the central electrode on the side where the central electrode contacts the buffer layer may be larger than the width of the ridge. Still further, the surface of the buffer layer immediately below the central electrode may be flat.

Also in the above construction, the central electrode may be formed of a plurality of layers. Moreover, of the plurality of layers, the layer in contact with the buffer layer may have a thickness of 1 μm or less.

Also in the above construction, there may be a region without the buffer layer between the central electrode and the ground electrodes.

Also in the above construction, the instant optical control device may be a Mach-Zehnder type optical intensity modulator.

Also in the above construction, the substrate may be comprised of $LiNbO_3$, $LiTaO_3$ or PLZT.

To attain the aforementioned object, the present invention also concerns an optical control device comprising a substrate having an electrooptic effect and having, formed therein, ridges including optical waveguides; a buffer layer formed on the surface of the substrate; and electrodes consisting of a strip electrode formed on the ridge via the buffer layer, and ground electrodes formed on the back of the substrate; the surface of the buffer layer formed in the portions other than the ridges being formed to be lower than the surface of the buffer layer formed on the ridges; and the width and depth of the ridge, the thickness of the buffer layer, and the shapes and dimensions of the electrodes being set so that the microwave loss of the electrodes will be decreased, the velocity of microwaves propagating in the electrodes and the velocity of light propagating through the optical waveguides will exactly or nearly match each other, and the impedance of the electrodes will exactly or nearly match a desired impedance; wherein the width of the strip electrode on the side where the strip electrode contacts the buffer layer is larger than the width of the core of the optical waveguide.

Hereinabove, the desired impedance may be the characteristic impedance of an external circuit.

In the above construction, the width of the strip electrode on the side where the strip electrode contacts the buffer layer may be larger than the average of the width of the core and the width of the ridge in the optical waveguide. Further, the width of the strip electrode on the side where the strip electrode contacts the buffer layer may be larger than the width of the ridge. Still further, the surface of the buffer layer immediately below the strip electrode may be flat.

Also in the above construction, the instant optical control device may be a Mach-Zehnder type optical intensity modulator.

Also in the above construction, the substrate may be comprised of $LiNbO_3$, $LiTaO_3$ or PLZT.

The above and other objects, effects features and advantages of the invention will become more apparent from the following description of embodiments thereof taken in conjunction with the accompanying drawings.

DETAILED DESCRIPTION OF PREFERRED EMBODIMENTS

Figure 1:
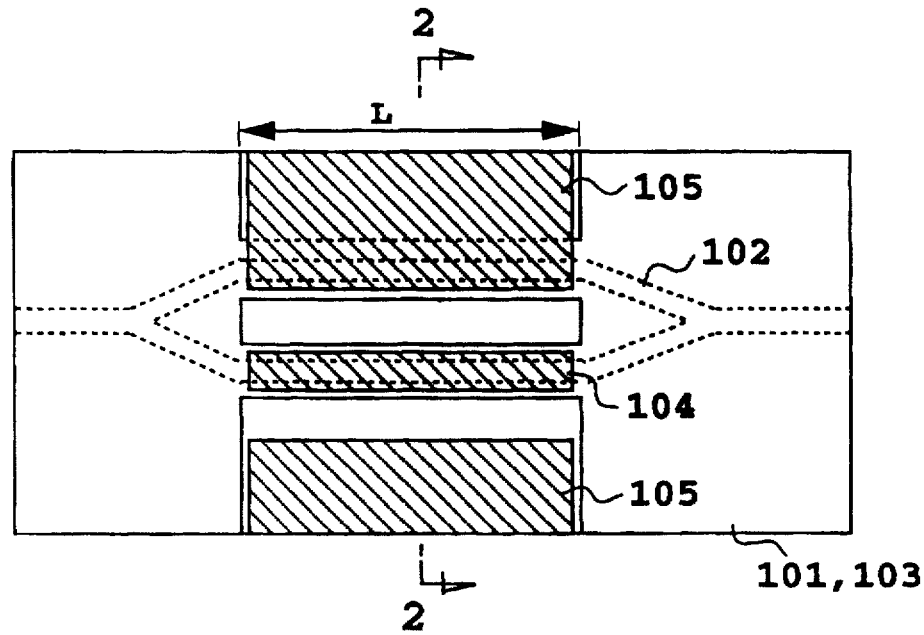
FIG. 1 is a plan view showing an example of a conventional Mach-Zehnder type optical intensity modulator.
Figure 2:
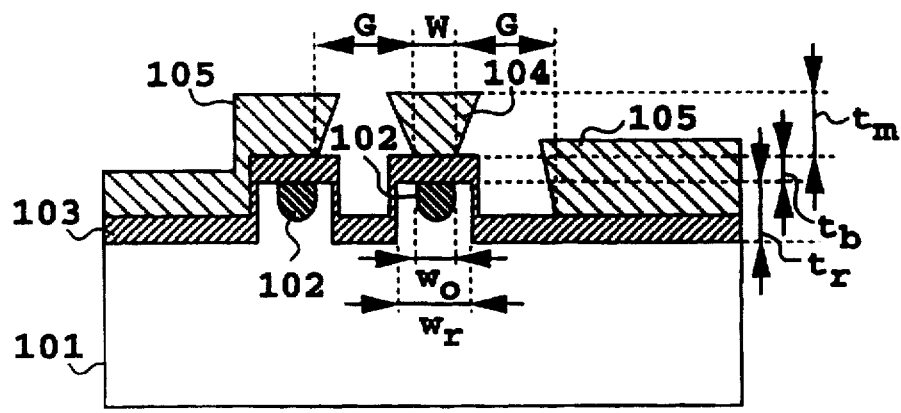
FIG. 2 is a sectional view showing the conventional Mach-Zehnder type optical intensity modulator of FIG. 1.

First, how the present invention makes the device characteristics constant will be clarified. With a conventional modulator as shown in FIGS. 1 and 2, the width W of a central electrode 104 was set to be smaller than the width $w_r$ of a ridge, and to be equal to the width $w_o$ of a core 102 of an optical waveguide (e.g., $w_r$=9 μm, $w_o$=W=8 μm). A first reason for this is that the central electrode 104 is formed on the ridge, and thus, making its width smaller than the width of the ridge facilitates its production. Secondly, if the width of the central electrode 104 is large, the capacitance between the central electrode 104 and the ground electrode 105 increases, making impedance-matching difficult to achieve; hence, the width of the central electrode 104 was made the minimum size required, that is, the width of the core 102 of the optical waveguide.

As will be discussed in detail later by reference to FIG. 5, however, the device characteristics of an optical control device abruptly vary in a region where the width W of the central electrode is smaller than the core width $w_o$ of the optical waveguide. Thus, the presence of only slight differences in the width W of the central electrode in the respective devices produced make the device characteristics fluctuate. Accordingly, the driving voltage, the operating bandwidth, and the characteristic impedance will stabilize, if the width W of the central electrode is set to be larger than the core width $w_o$ of the optical waveguide, preferably, larger than the average of the core width $w_o$ and the ridge width $w_r$ of the optical waveguide, and more preferably, larger than the ridge width $w_r$.

Next, how the present invention eliminates the limits of the bandwidth present in the conventional device will be elucidated. If $n_m$ approaches to $n_o$, the operating bandwidth will broaden according to equation (1), but will not go beyond a certain width. Equation (1) is a theoretical equation established in disregard for loss which occurs as microwaves propagate in the electrodes. Since the actual loss of the electrodes is not zero, it must be taken into consideration when $n_m$ has fully approached $n_o$. When $n_m$ has agreed with $n_o$, the width $\Delta f_2$ of the operating bandwidth is given by $$\Delta f_2 (GHz) = 40/(\alpha L)^2 \qquad (2)$$

where $\alpha$ is the attenuation constant (conductor loss, dB/cm) at 1 GHz.

Thus, the microwave attenuation constant should be lowered for achieving a broad bandwidth. At this time, the impedance of the microwave electrodes must be matched with the external circuit.

So far, the factors for restricting the operating bandwidth of an optical control device have been mainly the velocity-mismatch between the microwave and light, and the mismatch of the characteristic impedance between the modulating electrode and the external circuit. The microwave loss has been considered minor.

However, a device structure as shown in FIGS. 1 and 2, developed by us, has made it possible to completely achieve velocity-matching between the microwave and light, and to completely match the characteristic impedance of the modulating electrodes to that of the external circuit. With the device structure of FIGS. 1 and 2 we have developed, therefore, microwave loss presents a major factor for limiting the bandwidth.

Based on the finding that the above-described limitation on the operating bandwidth of the optical control device is attributed to microwave attenuation, of we have worked out the measure of making the width W of the central electrode larger than the core width $w_o$ of the optical waveguide, preferably larger than the average of the ridge width $w_r$ and the core width $w_o$ in the optical waveguide, and more preferably still, larger than the ridge width $w_r$. The microwave loss, or the attenuation constant, is given by $$\alpha = (R/2)\sqrt{C/L} \qquad (3)$$

provided that the leakage conductance between the electrodes can be neglected. In equation (3), R and L are the resistance and the inductance, respectively, per unit length of the length of the central electrode, and C is the capacitance per unit length between the electrodes.

The present invention involves two points: First, the width of the central electrode is large. Secondly, as the width of the central electrode increases, the thickness of the central electrode also increases (because of the manufacturing technology, the aspect ratio, $t_m/W$, is restricted to at most from 3 to 4). In these two respects, the sectional area of the central electrode can become large, thus lowering R. The parameter C, which should become large in proportion to the width of the electrode as will be discussed later, scarcely increases as will be discussed later. Thus, the loss $\alpha$ decreases, and the operating frequency inversely proportional to the square of $\alpha$ can be dramatically widened.

With an optical modulating device having a ridge as shown in FIGS. 1 and 2, the width of the central electrode has been formed to be comparable to the width of the optical waveguide. This is because as the with of the central electrode is increased, an increase in the microwave loss, and a decrease in the characteristic impedance and/or an increase in the driving voltage can be expected. These are possibilities suggested by the findings obtained with optical modulating devices having an optical waveguide formed on a flat substrate (the devices developed prior to the optical modulating device of FIGS. 1 and 2).

The characteristic impedance $Z_o$ of the modulating electrode is given by $$Z_o = \sqrt{L/C} \qquad (4)$$

if the leakage conductance G between the electrodes and the resistance R per unit length of the length of the central electrode can be neglected.

That is, when the width of the central electrode is enlarged, the capacitance of the modulating electrodes increases. Thus, the microwave loss of increases in accordance with equation (3), and the characteristic impedance decreases following equation (4). To avoid these disadvantages, the thickness of the buffer layer or/and the gap between the central electrode and the ground electrode must be increased. By so doing, however, the intensity of the electric field in the optical waveguide is decreased. To obtain a desired extinction ratio, therefore, the driving voltage had to be increased.

As will be described in detail in the Embodiments, however, the present invention having optical waveguides formed with a ridge structure has the following features: (1) Lines of electric force concentrate in the ridges formed in the substrate comprising a ferroelectric material such as LN, so that even if the width of the central electrode is larger than the width of the ridge, the capacitance of the modulating electrodes minimally changes. (2) The lines of electric force concentrate in the ridges. And then, the dielectric constant in a direction parallel to the substrate is much greater than the dielectric constant in a direction perpendicular to the substrate because of the anisotropy of the ferroelectric material. Thus, even if the gap between the electrodes is widened, the electric field strength in the ridges scarcely varies.

The microwave electrodes have been described in connection with coplanar waveguides where the ground electrodes and the central electrode are provided on the same plane. However, the same actions and effects can be exhibited by using microstrip waveguides in which the ground electrodes are formed on the back of the substrate, and a strip electrode is used instead of the central electrode.

Embodiment 1

Figure 3:
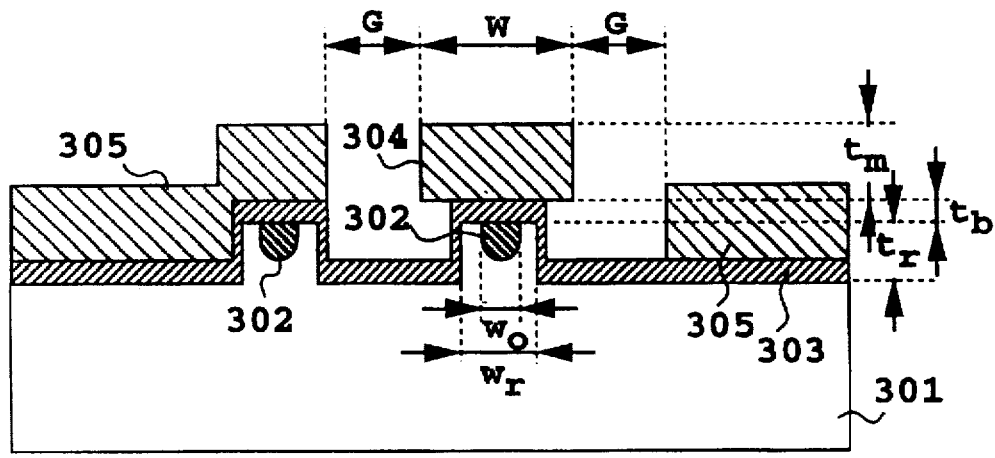
FIG. 3 is a sectional view of a first embodiment of the present invention.

FIG. 3 is an embodiment of a ridge-structured Mach-Zehnder type optical intensity modulator using a z-axis (crystalline c axis)-cut LN substrate and coplanar waveguide electrodes according to the present invention, with a central portion of the modulator being indicated as a section. An LN substrate 301 is ridge-structured by etching the surface of the LN substrate in the vicinity of cores 302 of optical waveguides. The width W of a central electrode 304 is constituted so as to be larger than the ridge width $w_r$ of the ridge located immediately below. The edge of a ground electrode 305 is constituted so as to cover another optical waveguide ridge. For a buffer layer 303, a material with a smaller dielectric constant than that of LN, such as $S_iO_2$ and polyimide, is selected. The gap G between the central electrode 304 and the ground electrode 305, the thickness $t_b$ of the buffer layer 303, the depth $t_r$ of the ridge, and the thickness $t_m$ of the electrode are selected such that velocity-matching between the light and microwave will be ensured, and the characteristic impedance Z will be made a suitable magnitude (say, Z=50Ω) for its matching with the impedance of an external circuit. Here in the drawing, the shape of the electrode is rectangular, but the same effect will appear if the central electrode 304 and/or the ground electrode 305 is in any form, such as a trapezoidal, inverted-trapezoidal, or multi-layered form.

Embodiment 2

Figure 4:
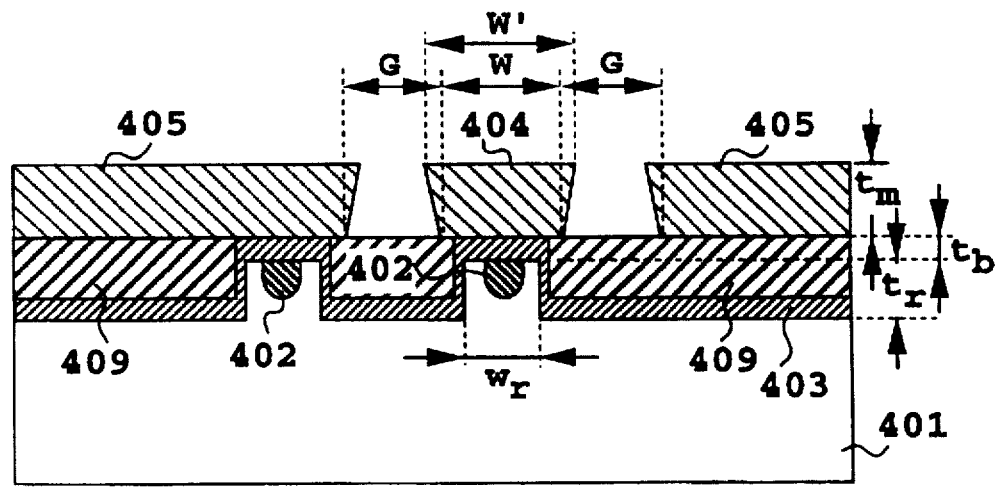
FIG. 4 is a sectional view of a second embodiment of the invention.

FIG. 4 is a sectional view of another embodiment of an optical modulator according to the present invention. A low dielectric constant material 409 such as polyimide is formed as if burying the ridge portions of an LN substrate 401 to make a flat shape. A central electrode 404 is in the shape of an inverted trapezoid. The gap G between the central electrode 404 and a ground electrode 405, the thickness $t_b$ of a buffer layer 403, the depth $t_r$ of the ridge, and the thickness $t_m$ of the electrode are selected such that velocity-matching between the light and microwave will be ensured, and the characteristic impedance Z will be, for example, Z=50Ω, as in the first embodiment of FIG. 3.

In the present invention, whatever the sectional shapes of the electrode are, and whatever the material and shape of the buffer layer and the low dielectric constant material are, the width W of the central electrode on the side where the central electrode contacts the buffer layer may be set to be larger than the core width $w_o$ of the optical waveguide, and preferably larger than the average of the core width $w_o$ and the ridge width $w_r$ in the optical waveguide, more preferably, larger than the ridge width $w_r$. Setting the thickness $t_m$ of the central electrode to be greater than the width W of the central electrode will enhance the effect of the present invention. Since the low dielectric constant material 409 flattens the surface of the device, moreover, the width W of the central electrode 404 can be set at an arbitrary magnitude without being restricted by the magnitude of the ridge width $w_r$.

Figure 5:
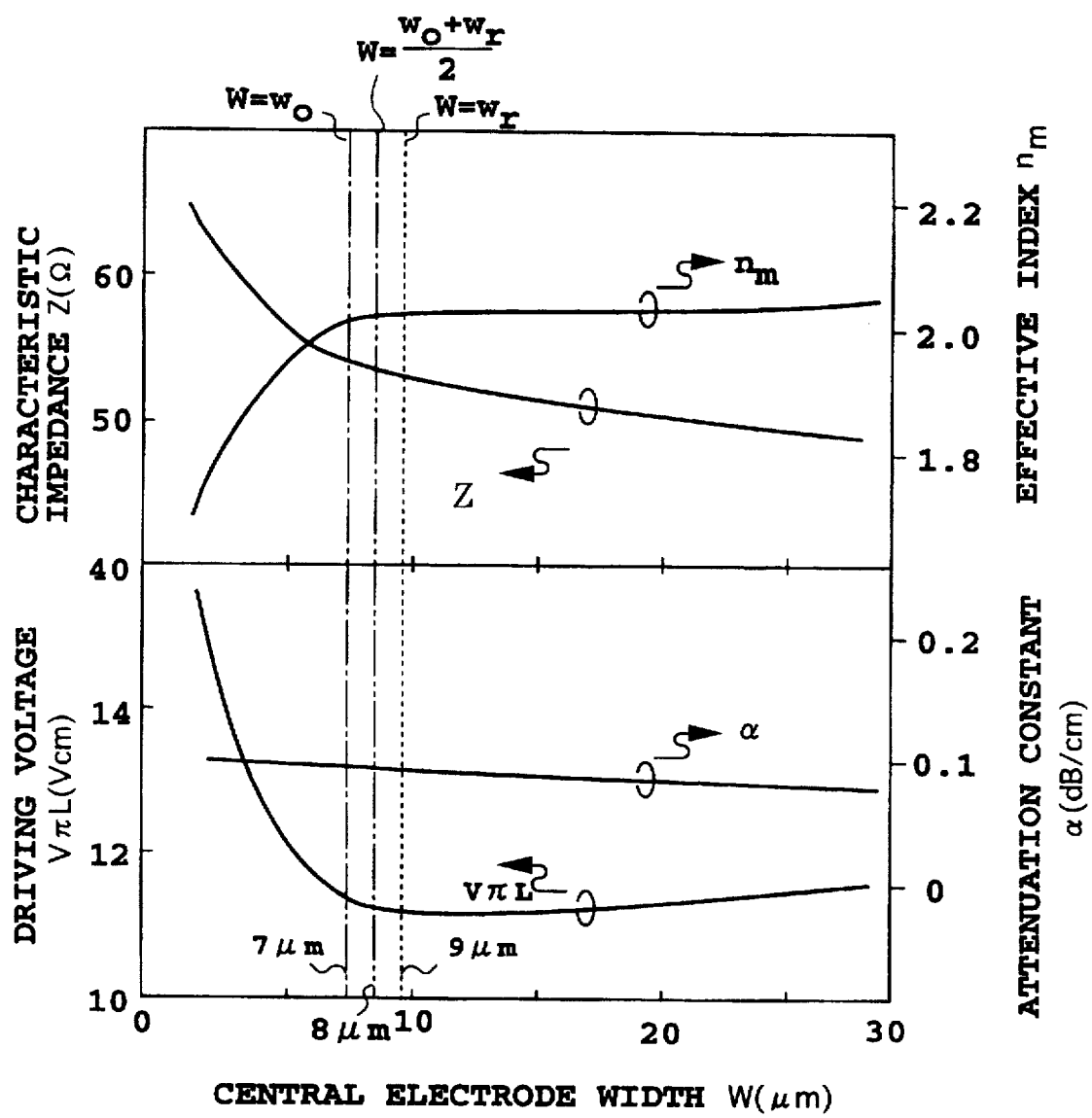
FIG. 5 is a microwave characteristic chart for illustrating the principle and effects of the invention.
Figure 6:
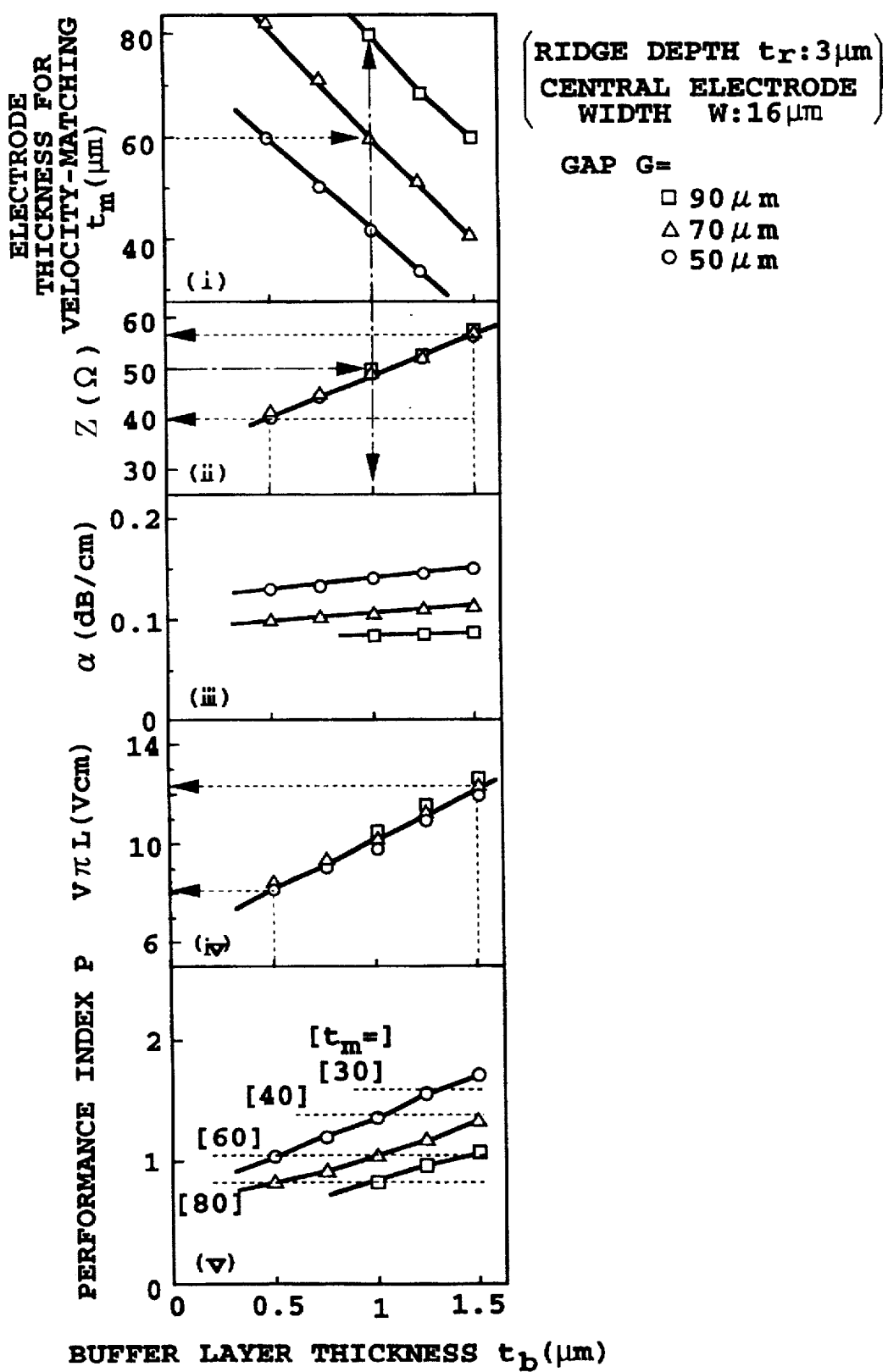
FIG. 6 is a microwave characteristic chart for illustrating the principle and effects of the invention.

FIGS. 5 and 6 are views for illustrating the principle and effects of the present invention as examples in which the driving voltage and the microwave characteristics of a modulator using an LN substrate were calculated by the quasi-static approximation method.

FIG. 5 shows the central electrode width W dependence of the modulator characteristics with an electrode structure having the following dimensions in the first embodiment of the present invention indicated in FIG. 3: electrode thickness $t_m$=60 μm; G=70 μm, $SiO_2$ buffer layer thickness $t_b$=1.0 μm, ridge depth $t_r$=3 μm, ridge width $w_r$=9 μm, and optical waveguide core width $w_o$=7 μm. Here, the state in which W is smaller than 7 μm represents the characteristics of the conventional example (FIGS. 1 and 2). FIG. 5 shows that as the central electrode width W is increased gradually from 0, the driving voltage VπL of a unit length of the electrode decreases, while increases in $n_m$ and decreases in the characteristic impedance Z become marked. However, if the central electrode width W is increased to 7 μm or more, preferably 8 μm or more, and more preferably 9 μm or more, one will see that the W dependence of Z and $n_m$ becomes extremely small, and also the increasing tendency of VπL is extremely small. This means that by enlarging the central electrode width W, one of the features of the present invention, adverse influences on the characteristics Z, VπL and $n_m$ as have been feared with the conventional example, do not occur. This is because the LN substrate is ridge-structured, so that the following mechanisms work: (1) The LN substrate is made of a ferroelectric material. Thus, even when the central electrode width W is larger than the ridge width $w_r$, the total amount of lines of electric force do not vary so much, but these lines of electric force keep concentrating in the substrate ridge portions. Consequently, the electrostatic capacity between the electrodes does not increase markedly. In other words, even when the central electrode width W is larger than the ridge width $w_r$, the dielectric constant of air below the protruding portion of the electrode is much smaller than the dielectric constant of the LN, so the electrostatic capacity between the electrodes does not increase greatly. (2) The dielectric constant of the LN has anisotropy ($\epsilon$//>$\epsilon \perp$) in directions parallel (:$\epsilon$//) and perpendicular (:$\epsilon \perp$) to the surface of the c-axis cut crystal. Thus, an action to weaken the horizontal electric field works, so that even when the Mach-Zehnder optical waveguide gap (≈W/2+G) increases with an increase in W, there is little change in the microwave electric field strength in the c-axis direction (the direction perpendicular to the substrate surface) in the ridge portion of the LN substrate. The features of the present invention are attributed to these structural contrivances. These features are one of the structural advantages that produce the effects of the present invention and that are lacking in the conventional example.

In FIG. 5, the electrode thickness $t_m$ is fixed at 60 μm. In the conventional example with W of 7 μm or less, however, formation of such a thick electrode is impossible because of a limitation on the aspect ratio of the shape of the electrode. In the present invention, by contrast, the width W of the central electrode can be set to be fully large as compared with the required magnitude of the electrode thickness $t_m$. Thus, this invention is free from this limitation, making it possible to form a sufficiently thick electrode. This is another advantage of the present invention.

Figure 7:
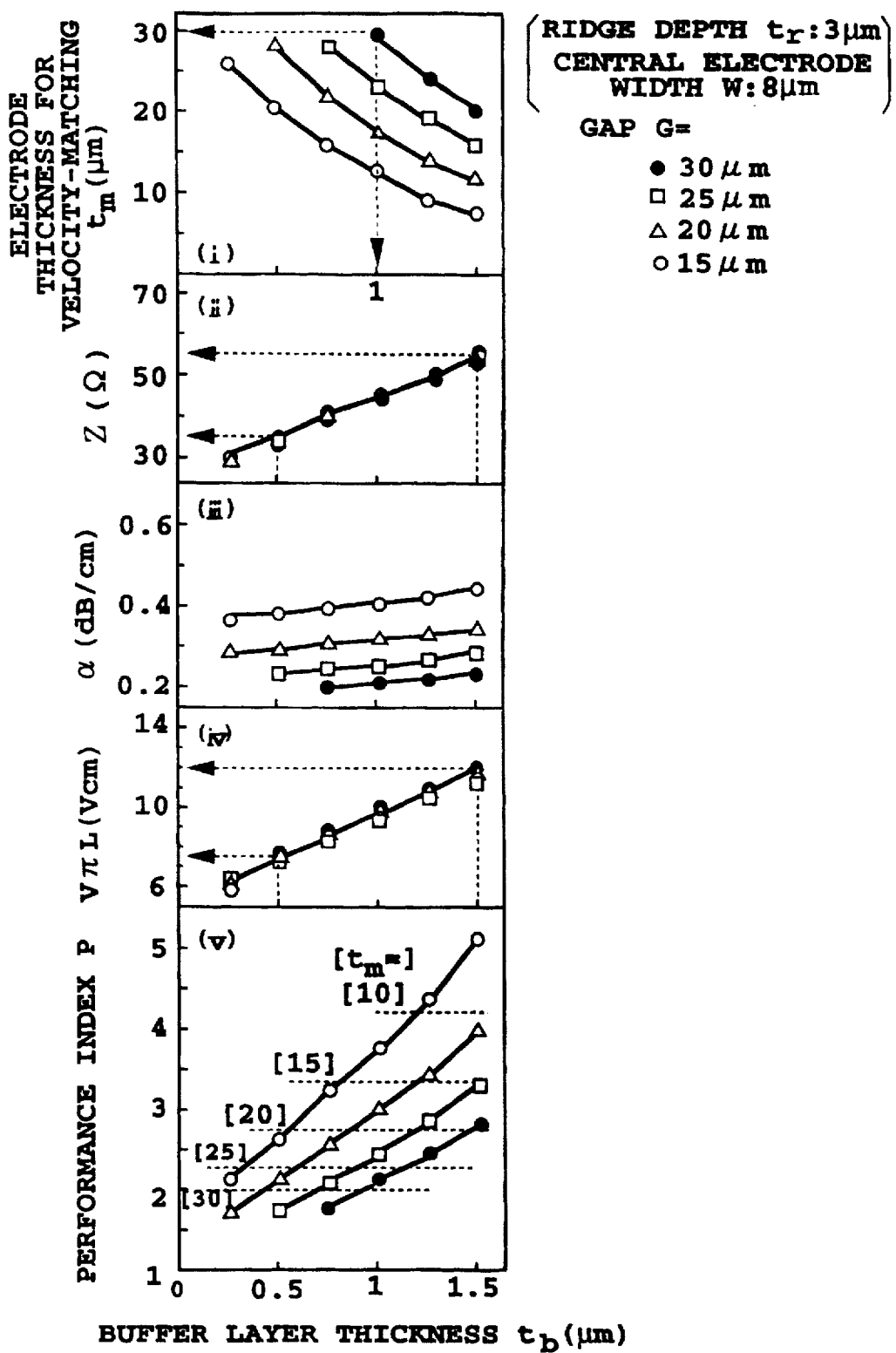
FIG. 7 is a microwave characteristic chart for the conventional example.

FIG. 6 shows the characteristics obtained for the embodiment of FIG. 3 in which the dimensions are set so that the width W of the central electrode on the side where the central electrode contacts the buffer layer is larger than the width $w_r$ of the ridge, and so that the velocity of the microwave propagating in the electrode and the velocity of light propagating through the optical waveguide become equal to each other; namely, the width W of the central electrode of the modulating electrodes is W=16 μm (fixed width), ridge width $w_r$=9 μm, ridge depth $t_r$=3 μm, and optical waveguide core width $w_o$=7 μm. For comparison, FIG. 7 shows the case in which the dimensions are set as follows: The width W of the central electrode is smaller than the width $w_r$ of the ridge, W=8 μm, ridge width $w_r$=9 μm, ridge depth $t_r$=3 μm, and optical waveguide core width $w_o$=7 μm.

FIG. 6(i) and FIG. 7(i) show the magnitude of the electrode thickness $t_m$, necessary to ensure the velocity-matching between the microwave and the light wave, versus the buffer layer thickness $t_b$ of the modulator in terms of the gap G between the central electrode and the ground electrode. In these drawings, (ii) to (v) present the characteristic impedance Z, microwave attenuation constant α (conductor loss at 1 GHz), driving voltage VπL, and performance index p, respectively, of the modulator obtained when the electrode thickness $t_m$ is set at the value indicated in (i). Here, the wavelength of the light is in the 1.5 μm band. The performance index p is defined by $$p = V\pi L \cdot \alpha \qquad (5)$$

When the microwave and light match in velocity, and the modulator and the signal source also match in impedance, the driving voltage Vπ(V) and the electrical 3 dB bandwidth Δf (GHz) are given by the relation:

$$V\pi/f^{1/2} = p/6.4 \qquad (6)$$

That is, the smaller p the electrode structure has, the higher performance (lower driving voltage, broader bandwidth) the modulator can attain.

Comparisons between FIG. 6(ii) and FIG. 7(ii) show that under the velocity-matching conditions, the characteristic impedance Z minimally depends on the magnitudes of the interelectrode gap G and the central electrode width W, but is determined almost unconditionally by the buffer layer thickness $t_b$. The driving voltage VπL is also minimally affected by the magnitudes of the central electrode width W and the interelectrode gap G, but is determined almost unconditionally by the buffer layer thickness $t_b$. Thus, one will see that the increase of W, one of the features of the present invention, exerts minimal adverse influence on the characteristics Z and VπL.

According to FIG. 6 (iii) and (v) and FIG. 7 (iii) and (v), the attenuation constant α and the performance index p are greatly dependent on the interelectrode gap G, and as the interelectrode gap G widens, the attenuation constant α lowers and the performance index p becomes small.

The use of FIG. 6 enables the structural parameters for an optical control device to be determined. First, the buffer layer thickness $t_b$ is determined by FIG. 6(ii) such that the characteristic impedance will be 50Ω. Given this buffer layer thickness, the interelectrode gap G and the electrode thickness $t_m$ for matching the velocity of light with the velocity of the microwave are determined by FIG. 6(i).

As stated above, the performance index p becomes small as the interelectrode gap G widens, and smaller p is preferable. However, the magnitude of the interelectrode gap G has limits determined by the width W of the central electrode. That is, manufacturing restrictions make the ratio of the electrode thickness $t_m$ to the central electrode thickness W (aspect ratio) from 3 to 4. Thus, the upper limit of the electrode thickness $t_m$ is determined, whereby the upper limit of the interelectrode gap G is also determined when the thickness of the buffer layer is fixed (FIG. 6(i)).

FIG. 6 gives the results of calculation obtained when the width W of the central electrode is 16 μm. At an aspect ratio of 3.75, the electrode thickness $t_m$ comes to be 60 μm. For a characteristic impedance Z of 50Ω, the buffer layer thickness $t_b$ is 1 μm. Under these conditions, FIG. 6(iii) and (v) show that the attenuation constant α and the performance index p at the interelectrode gap of 70 μm are 0.1 dB/cm and 1.0, respectively.

FIG. 7 gives the results with a central electrode width of 8 μm. The attenuation constant α and the performance index p obtained at the same aspect ratio are 0.23 dB/cm and 2.5, respectively. In the embodiment shown in FIG. 6 (central electrode width 16 μm), therefore, a more than 2-fold improvement in the performance index was achieved compared with the embodiment with the central electrode width of 8 μm. As a result, the operating bandwidth was more than 4 times as wide.

FIG. 6 gives the results with a central electrode width W of 16 μm. According to the present invention, W may be increased to a degree to which the electric field strength of the ferroelectric substrate ridge portion immediately below the central electrode does not markedly decline (the magnitude of VπL scarcely varies). Thus, the effects of the present invention can be obtained if the central electrode width W is set to fall within the range of from about 10 μm to about 100 μm by relying on the constituent materials of the modulator and the magnitude of G.

With regard to the central electrode-ground electrode gap G, the greater the value of G, the smaller the parameter p becomes. However, the value of G is restricted by the aspect ratio. In addition, it should be considered that a value of G higher than necessary may adversely affect the microwave characteristics owing to frequency dispersion. That is, a sufficiently smaller dimension than the wavelength of the microwave signal should be selected in view of the upper limit of the operating frequency so that its influence will be reduced. Actually, G is set at about 10 to 1,000 μm. In regard to the thickness $t_m$ of the modulating electrode, the larger $t_m$, the more desirable the characteristics become. Preferably, the electrode thickness $t_m$ is set to be equal to or more than the width of the central electrode ($t_m > ~ W$). The thickness $t_b$ of the buffer layer is set mainly depending on the limitation on the magnitude of the characteristic impedance. In consideration of the producibility of the modulator, optical waveguide propagation loss, the stability of the characteristics, or driving voltage, $t_b = 0.1$ to 10 μm.

The ridge shape of the LiNbO₃ has been concretely described for $t_r = 3$ μm and $w_r = 9$ μm. With the optical modulator of the present invention, however, the ridge dimensions may be set normally at $t_r = 1$ to 10 μm and $w_r = 5$ to 20 μm, as in the conventional example of FIGS. 1 and 2, in the light of the VπL characteristic lowering effect, the microwave characteristic, the ease of the LiNbO₃ etching step, the optical waveguide width $w_o$, and the optical propagation loss.

In FIG. 6, the conductor loss decreasing effect of the present invention has been described, but the effect as explained in FIG. 5 is naturally given in FIG. 6. In the conventional example, as seen from FIG. 5, the characteristic impedance Z, the effective index $n_m$, and the driving voltage VπL greatly vary according to slight changes in the central electrode width W, thereby resulting in large variations in the characteristics of the products. By setting the central electrode width W to be larger than the ridge width $w_r$ (i.e. at 9 μm or more), however, the magnitude of change in each characteristic according to a change in the central electrode width W can be decreased, and variations in the products can be kept to the minimum.

Embodiment 3

Figure 8A:
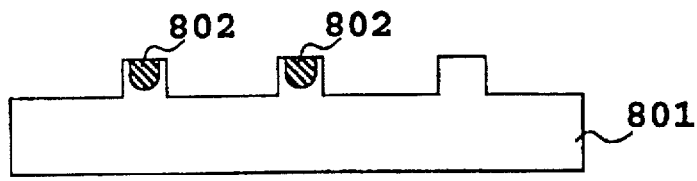
FIGS. 8A–8E are sectional views illustrating an example of a method for producing an optical control device in accordance with a third embodiment of the invention.
Figure 8B:
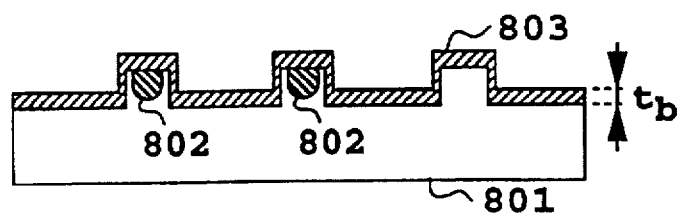
Figure 8C:
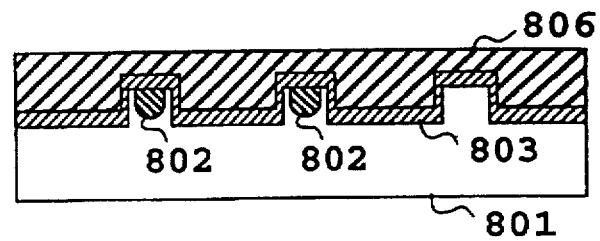
Figure 8D:
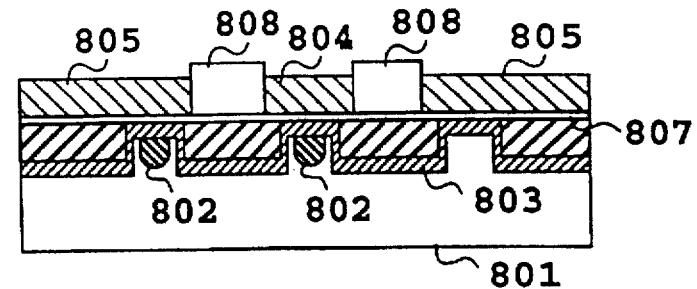
Figure 8E:
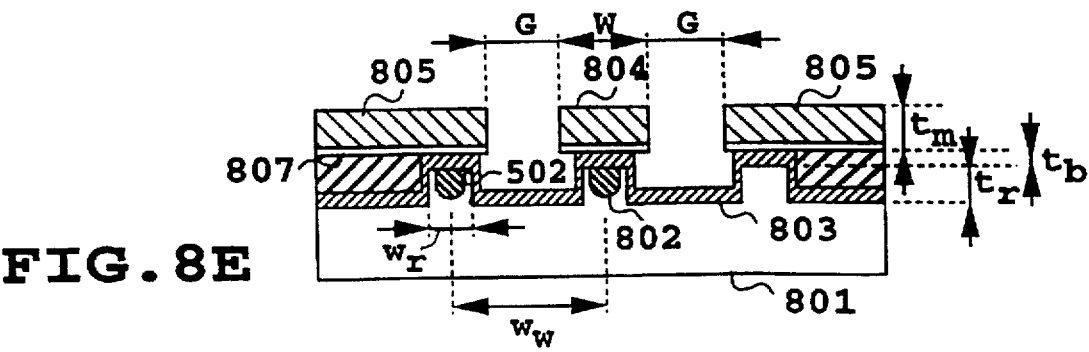

FIG. 8 shows an example of a method for producing an optical modulator according to the present invention (FIG. 8(e)). (a) First, as in the conventional example, cores 802 constituting Mach-Zehnder type optical waveguides are formed on the surface of an LN substrate 801 by Ti-diffusion. Furthermore, that surface of the LN substrate surrounding the cores 802 of these optical waveguides is etched to form ridges. (b) A buffer layer 803 is formed on the LN surface to a thickness of $t_b$. (c) A material 806 such as a photoresist or polyimide is formed on the LN substrate surface to flatten it. (d) Then, the material 806 is uniformly etched throughout the LN surface until the surface of the buffer layer 803 at the ridge portions is exposed to the outside. Then, a metal film 807 having good adhesion to the buffer layer 803 is formed by deposition or the like. Further, a resist pattern 808 for electrode formation is formed on the metal film 807, and thick film electrodes 804, 805 are formed by electroplating or the like. (e) The resist 808, and the metal film 807 between the central electrodes 804 and the ground electrode 805 are removed, and the material 806 is also removed to produce an optical modulator in accordance with the present invention. FIG. 8 shows an example of electrode formation by plating. However, it is obvious that other methods can be employed, such as mechanical lamination of wires, or various thick film electrode forming techniques, including printed circuit boards manufacturing techniques. The optical control device of the present invention can also be produced by adding to or combining with the process of FIG. 8 various photolithographic technologies or film forming techniques.

Embodiment 4

Figure 9:
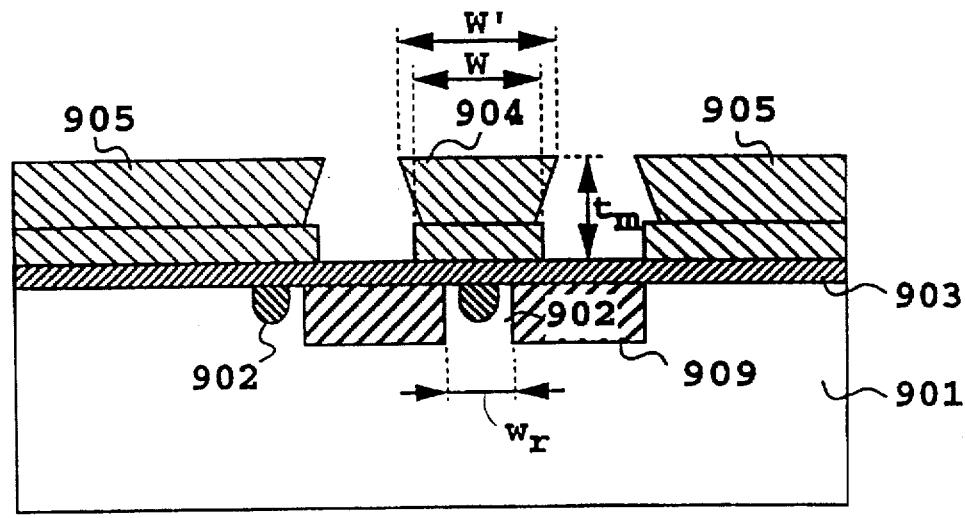
FIG. 9 is a sectional view of a fourth embodiment of the invention.

FIG. 9 is a sectional view of another embodiment of an optical modulator according to the present invention. The ridge portions are constituted as if being buried in a low dielectric constant material 909. The numeral 903 denotes a buffer layer. Since the dielectric constant of the dielectric material 909 is smaller than the dielectric constant of an LN substrate 901, the effects of the present invention can be obtained as in the embodiments of FIG. 3, FIG. 4 and FIG. 8(e). Electrodes 904, 905 may be composed of two or more layers by using a plurality of steps during electrode film formation, in order to make these electrodes effective thick films. As shown in the drawing, moreover, the electrodes are positively shaped like inverted trapezoids to enhance the electrical connection between the central electrode 904 and the ground electrodes 905. This conveys the advantage that the electrode thickness $t_m$ can be made relatively small compared with the shape of the electrodes being rectangular.

In FIG. 9, an optical waveguide 902 immediately below the ground electrode 905 is included in the ridge-structure different from that of a embodiment of FIG. 3. However, the microwave electric field strength of a core 902 portion of the optical waveguide immediately below the central electrode 904 is much greater than the electric field strength on the ground electrode 905 side. Thus, effects comparable to the characteristics shown in FIGS. 5 and 6 can be obtained as in FIG. 4.

Unlike the buffer layer of the conventional optical modular, the portions of the buffer layer 903, which are located on the low dielectric constant material 909, do not come into contact with the substrate 901. Thus, the portions of the buffer layer 903 are different from the buffer layer of the conventional optical modulator in their characteristics. Namely, it may be considered that there is no layer corresponding to the buffer layer of the conventional optical modular in spaces of the portion of the optical modular of this embodiment. Therefore, the optical modular of this embodiment may include a optical modular which has no buffer layer between a central electrode and ground electrodes, and the central electrode being formed broadly.

Embodiment 5

Figure 10:
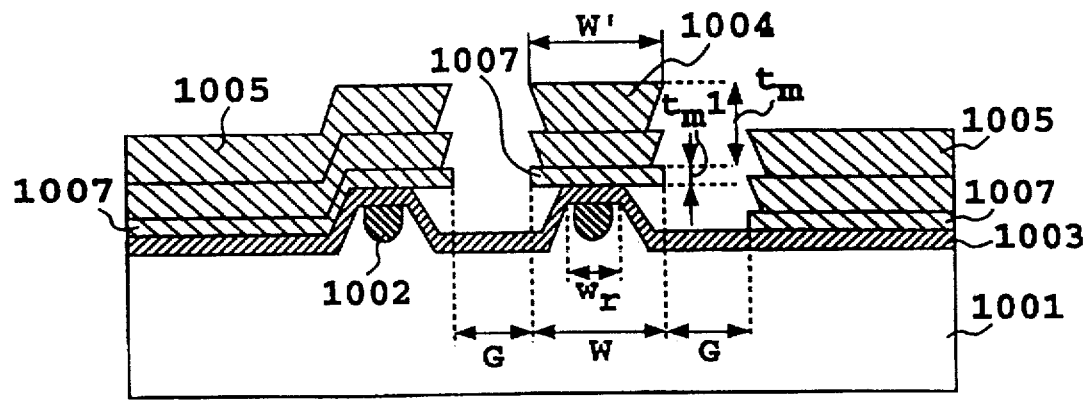
FIG. 10 is a sectional view of a fifth embodiment of the invention.

FIG. 10 is a sectional view of another embodiment of an optical modulator according to the present invention. To provide a large effective electrode thicknesses as in the embodiment of FIG. 9, the electrodes are formed in a plurality of layers. The first layer 1007 contiguous to a buffer layer 1003 is formed by, say, vacuum evaporation or sputtering, and is composed of a low-resistance metal layer, where necessary, via a metallic layer having good adhesion to the buffer layer 1003. The second and other layers may be formed as in FIG. 9. The width W of the first metal layer 1007 may be larger than the ridge width $w_r$, where necessary. If, in addition, the thickness $t_{m1}$ of the first layer 1007 is set at about 1 μm, a low voltage, broad bandwidth optical control device based on the principle of the present invention can be realized.

Such a multi-layered structure makes the thickness of the respective layers small. Thus, the dimensions of the electrodes can be made accurate, so that an optical modulating device as designed can be achieved. The width of the first-layer electrode contacting the buffer layer, in particular, greatly affects the characteristics of the device. Accurate dimensions of the layer of the electrode, first therefore, are highly important.

Embodiment 6

Figure 11:
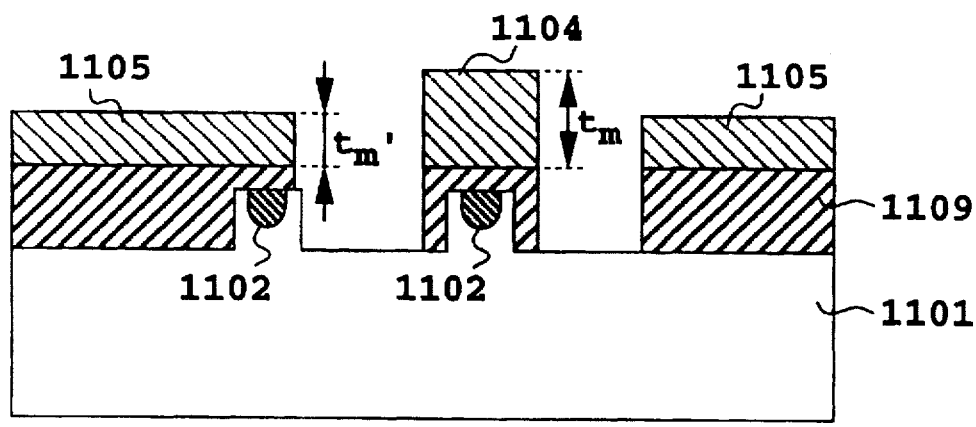
FIG. 11 is a sectional view of a sixth embodiment of the invention.

FIG. 11 is a sectional view of still another embodiment of an optical modulator according to the present invention. Ridges are formed in an LN substrate 1101, and cores 1102 of optical waveguide are formed in the ridge portions. This embodiment is a structure in which a dielectric 1109 at a gap between a central electrode 1104 and a ground electrode 1105 has been removed. This means that the dielectric 1109 has been replaced by air with a low dielectric constant. Thus, the microwave effective dielectric constant of the electrode can be made relatively low, and the electrode thickness $t_m$ necessary to satisfy the velocity-matching conditions can be rendered relatively small. Normally, the ground electrode 1105 is much bigger relative to the width of the central electrode 1104. As shown in the drawing, therefore, even if the ground electrode thickness $t_m'$ is smaller than the central electrode thickness $t_m$, the influence on the strength of the electric connection between the central electrode 1104 and the ground electrode 1105 is minimal. Thus, the effects of the present invention can be obtained similarly. Even if the ground electrode $t_m'$ is smaller or larger than $t_m$, it will suffice to design a device structure following the present invention in accordance with the thickness $t_m$.

Embodiment 7

Figure 12:
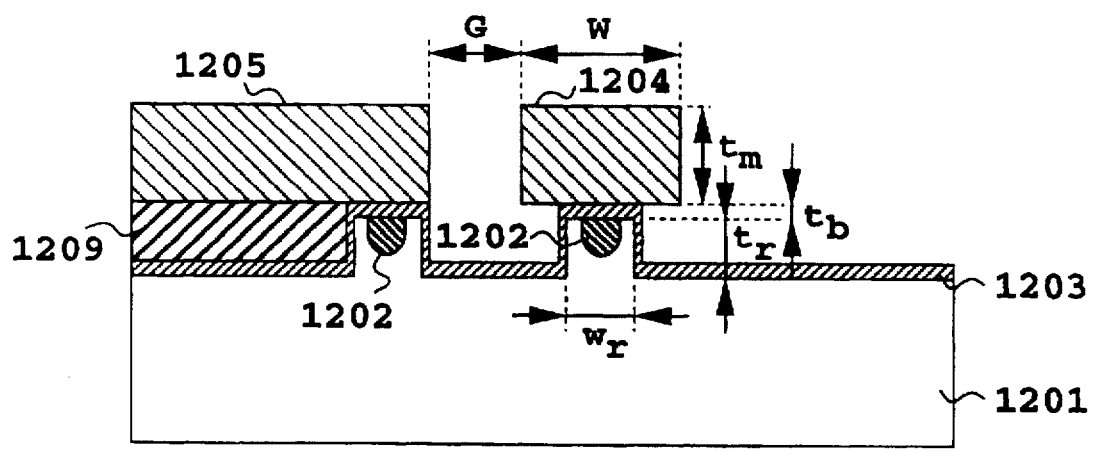
FIG. 12 is a sectional view of a seventh embodiment of the invention.

FIG. 12 is a sectional view of another embodiment of a high speed LiNbO$_3$ optical intensity modulator according to the present invention, using asymmetric coplanar strip line waveguides 1204, 1205 as modulating electrodes. The numeral 1201 denotes an LN substrate, and the numeral 1202 denotes a core of an optical waveguide, and the numeral 1209 denotes a dielectric. In this case, too, there may be employed a modulator construction in which the width W of the central electrode 1204 of the modulating electrodes is set to be larger than the ridge width $w_r$, the the gap G between the central electrode 1204 and the ground electrode 1205, the thickness $t_b$ of a buffer layer 1203, the ridge depth $t_r$, and the electrode thickness $t_m$ being constructed so as to achieve velocity-matching between light and microwave, and with the characteristic impedance Z being set at a suitable magnitude (e.g. Z=50Ω), under the same principle as in the embodiment of FIG. 3. This construction makes it possible to make the microwave loss of the electrode much smaller than in the conventional example, and to realize a low driving voltage, high broadwidth, high performance optical modulator.

Embodiment 8

Figure 13:
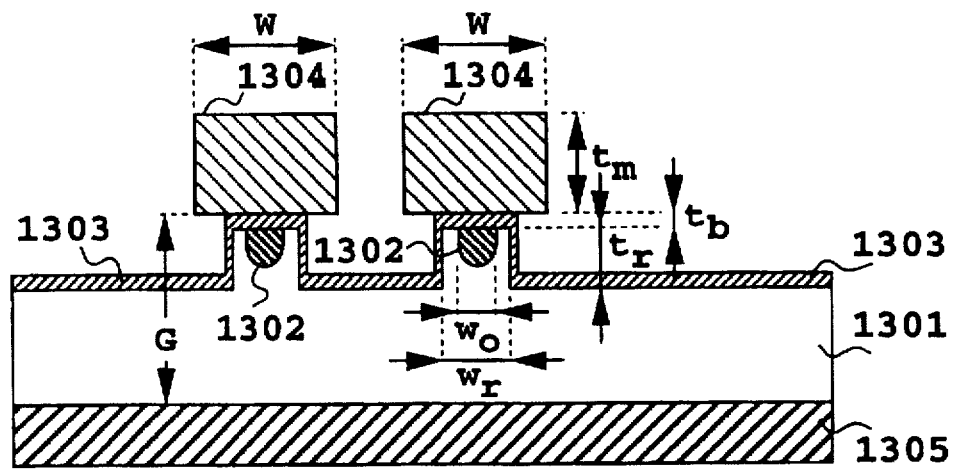
FIG. 13 is a sectional view of an eighth embodiment of the invention, showing the invention applied to an optical modulator having microstrip waveguides.

In the construction of Embodiment 7, even if symmetric coplanar strip line waveguides, or various microwave strip line waveguides, such as microstrip line waveguides comprising a strip electrode 1304 and a ground electrode 1305, as shown in FIG. 13, are used as the modulating electrodes, the same effects are clearly produced. In FIG. 13, the numeral 1301 denotes an LN substrate, and the numeral 1302 denotes a core of an optical waveguide, and the numeral 1303 denotes a buffer layer. In this constitution, two central electrodes 1304 can be driven by a microwave signal source, thus the device shown in FIG. 13, for example, can be push-pull operative or can be ternary-modulated.

Embodiment 9

Figure 14:
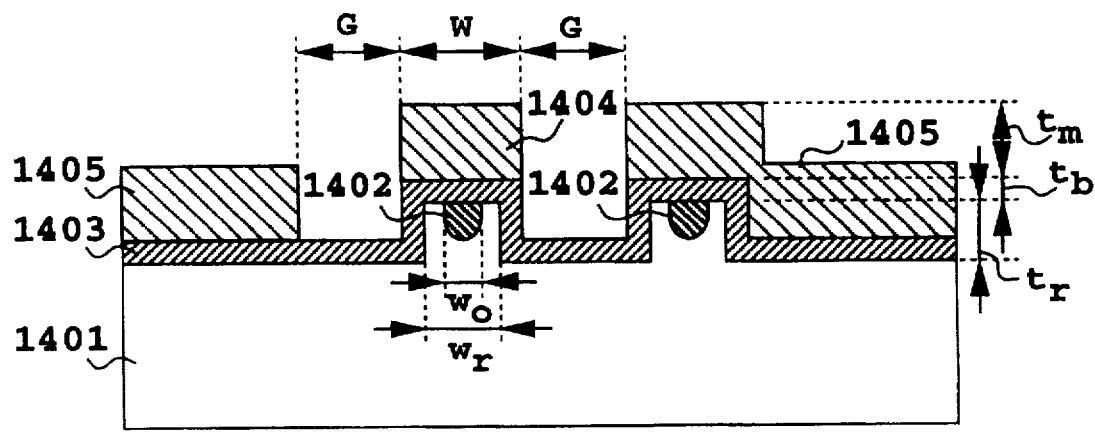
FIG. 14 is a sectional view of a ninth embodiment of the invention.

FIG. 14 is an embodiment of a Mach-Zehnder type optical intensity modulator using a z-axis (crystalline axis)-cut LN substrate and coplanar strip line waveguide electrodes according to the present invention, with a central portion of the modulator being indicated as a section. An LN substrate 1401 is ridge-structured by etching that surface of the LN substrate adjacent to cores 1402 of optical waveguides. A central electrode 1404 of the control electrodes is provided above the core 1402 of one of the optical waveguides, while ground electrodes 1405 are provided to sandwich the central electrode. The ridge-side width W of the central electrode 1404 of the control electrodes is selected so as to be larger than the width $w_o$ of the core 1402 of the optical waveguide located immediately below. The ground electrode 1405 of the control electrodes is constituted so as to completely cover the core of the other optical waveguide located immediately below. The gap G between the central electrode 1404 and the ground electrode 1405, the thickness $t_b$ of the buffer layer 1403, the ridge depth $t_r$, and the electrode thickness $t_m$ are selected such that velocity-matching between light and microwave will be ensured, the characteristic impedance Z will have a suitable magnitude (say, $Z=50\Omega$) for its matching with the impedance of the external circuit, and further the conductor loss (attenuation constant α) of the electrode will be made small.

The optical intensity modulator of FIG. 14 is produced by, although not restricted to, the same method as in the conventional example of FIGS. 1 and 2. The sectional shapes of the central electrode 1404 and the ground electrode 1405 in FIG. 14 are shown schematically, and do not mean that the sectional shape of the central electrode 1404, for example, should be rectangular. The sectional shape of the central electrode 1404 may be a inverted-trapezoidal as in FIGS. 1 and 2, or may be trapezoidal, as long as the width W of the central electrode on the side of the optical waveguide is larger than the width $w_o$ of the optical waveguide.

Embodiment 10

Figure 15:
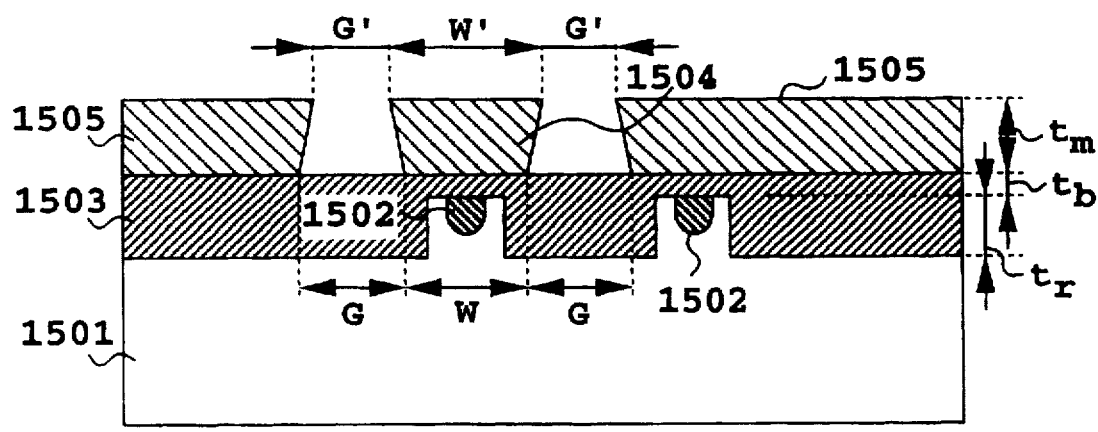
FIG. 15 is a sectional view of a tenth embodiment of the invention.

FIG. 15 is a sectional view of another embodiment of an optical modulator according to the present invention. A buffer layer 1503 is formed to be flat so as to cover a ridge-structured LN substrate 1501. A central electrode 1504 is in the shape of a trapezoid in which its upper-side width W' is different from its width W on the buffer layer side. The width W of the central electrode 1504 on the side where the central electrode 1504 contacts the buffer layer 1503 is greater than the width $w_o$ of a core 1502 of an optical electrode. The gaps G, G' between the central electrode 1504 and the ground electrode 1505, the thickness $t_b$ of the buffer layer 1503 on the ridge, the depth $t_r$ of the ridge, and the thickness $t_m$ of the electrode are selected such that velocity-matching between light and microwave will be ensured, and the characteristic impedance Z will, for example, be $Z=50\Omega$, as in the embodiment of FIG. 14.

Figure 16:
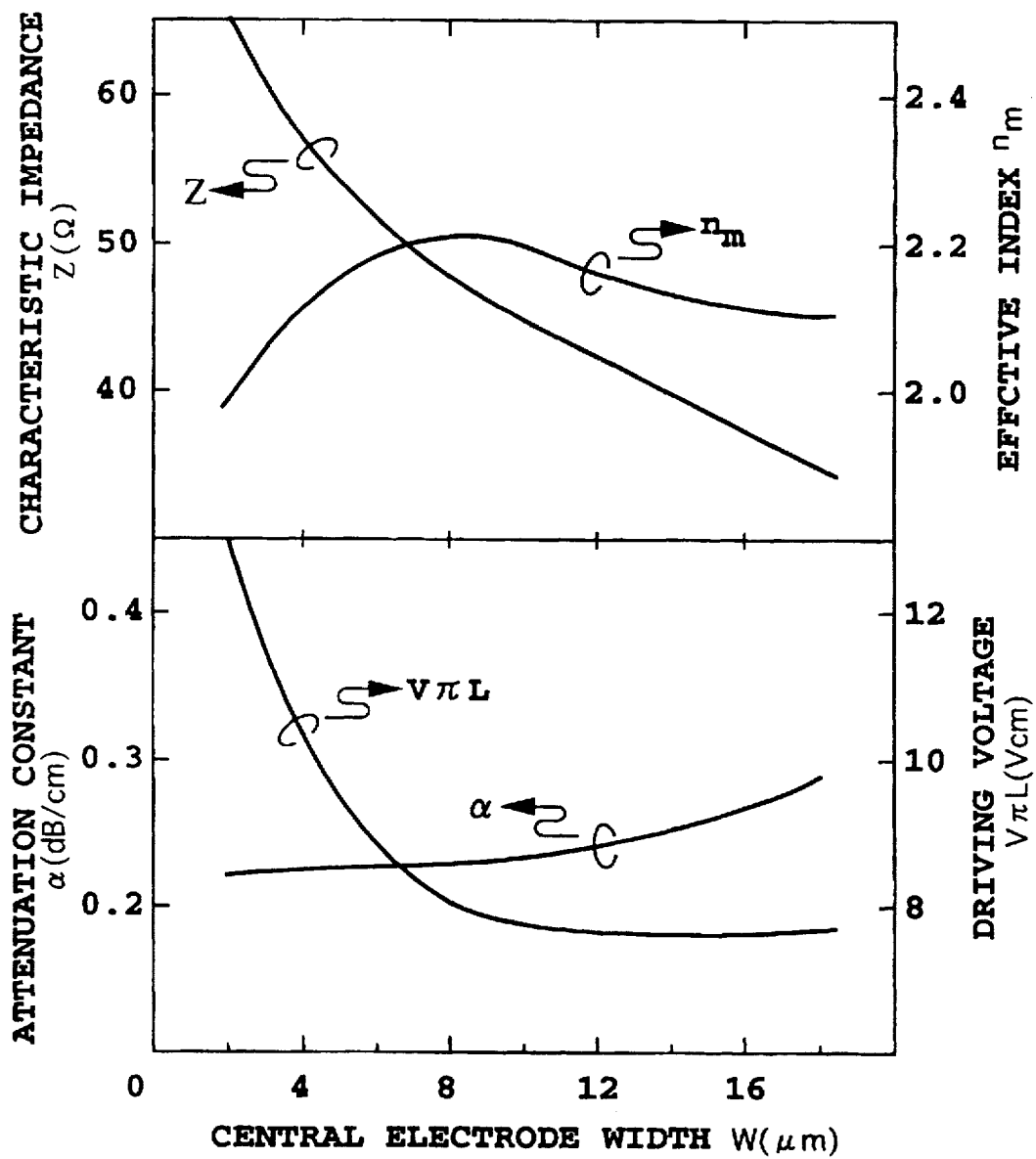
FIG. 16 is a microwave characteristic chart for illustrating the principle and effects of the invention.

FIG. 16 is view for illustrating the principle and effects of the present invention using an example in which the relationships between the width W of the central electrode and the microwave characteristics (characteristic impedance Z, microwave effective index $n_m$, and attenuation constant α) as well as the driving voltage VπL of a unit length electrode, of the modulating electrodes, were calculated by the quasistatic approximation method.

FIG. 16 shows the characteristics with an electrode structure having the following dimensions in the embodiment of FIG. 14: W+G=33 μm (fixed value), buffer layer ($SiO_2$) thickness $t_b=1.0$ μm, electrode thickness $t_m=20$ μm, ridge depth $t_r=3$ μm, ridge width $w_r=9$ μm, and optical waveguide width $w_o=7$ μm. In this embodiment, unlike the embodiment 2, as W+G is constant, the larger the central electrode width W is set, the smaller the interelectrode gap G is. FIG. 16 shows that as the central electrode width W becomes smaller than 7 μm, the driving voltage VπL sharply increases. The characteristic impedance Z and the microwave effective index $n_m$ also radically change as W becomes smaller. Thus, the various characteristics differ markedly in response to slight changes in the central electrode width W, resulting in a deterioration of the frequency characteristic. However, setting the central electrode width W at more than 7 μm decreases the driving voltage VπL. When the central electrode width W is larger than the ridge width $w_r$ (9 μm), the amounts of changes in the different characteristics according to changes in the central electrode width W become particularly small. Thus, one will see that variations in the characteristics of the products can be reduced, if variations in the central electrode width W are the same as in the conventional example. Although the magnitude of change in the microwave attenuation constant α is slightly great, the influences of change in α on the modulator characteristics (frequency characteristic, 3 dB bandwidth) are minimal, thus causing no practical problems.

Embodiment 11

Figure 17:
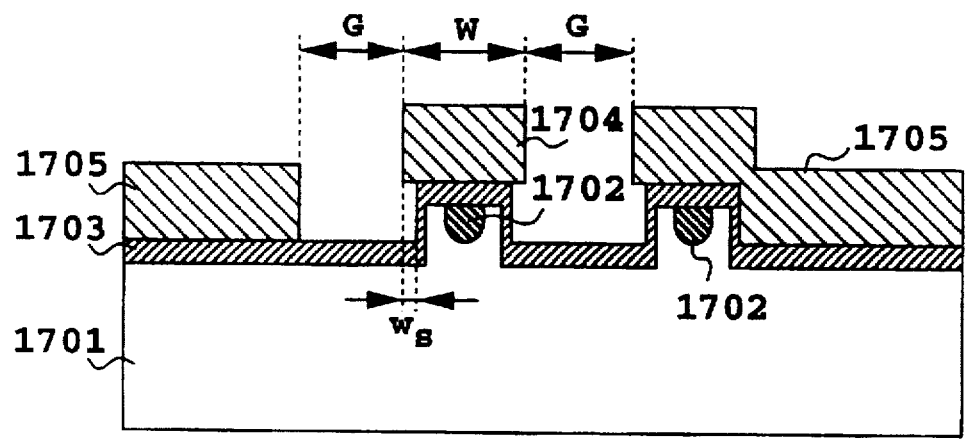
FIG. 17 is a sectional view of an eleventh embodiment of the invention.

FIG. 17 is a sectional view of another embodiment of an optical modulator according to the present invention. Cores 1702 of optical waveguides are formed in the ridge portions of an LN substrate 1701. The central electrode width W of the electrodes is formed to be larger than the width of the core 1702 of the optical waveguide, and the side surface portions of the electrodes 1704, 1705 are constructed to protrude beyond the side surface of a buffer layer 1703. The dielectric constant of air located between the central electrode 1704 and the ground electrode 1705 is smaller than the dielectric constants of the buffer layer 1703 and the LN substrate 1701, so that the width $w_s$ of the protrusion of the electrode beyond the buffer layer 1703 exerts minimal influence on the various characteristics. Hence, the instant embodiment is characterized in that variations in the characteristics responsive to changes in the central electrode width W become much smaller than in the embodiments of FIGS. 14 and 15.

Embodiment 12

Figure 18:
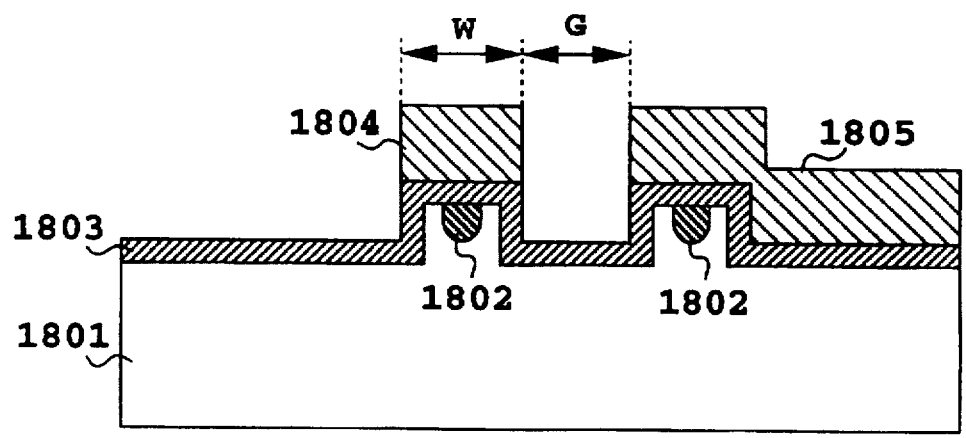
FIG. 18 is a sectional view of a twelfth embodiment of the invention.

FIG. 18 is a sectional view of another embodiment of an optical modulator according to the present invention, using asymmetric coplanar strip line waveguides as modulating electrodes. A buffer layer 1803 covers the surface of an LN substrate 1801 along ridges formed on the substrate. A ground electrode 1805 is provided over a core 1802 of one optical waveguide, on the buffer layer 1803 on this optical waveguide side. In this case as well, the effects of the present invention are produced, at least by making the width W of a central electrode 1804 larger than the width of the core 1802 of the optical waveguide. Similarly, the same effects can be obtained by using various microwave strip line waveguides, such as symmetric coplanar strip line waveguides, as modulating electrodes.

In the foregoing, the waveguide has the core width $w_o=7$ μm and ridge width $w_r=9$ μm. When these dimensions are changed, the effects of the present invention can be obtained likewise, if the magnitude of the central electrode width W is set according to the changed dimensions.

In the foregoing, the principle, effects and embodiments of the present invention have been described with reference to a high speed optical intensity modulator using $LiNbO_3$ as an electrooptic substrate, and $SiO_2$ as a buffer layer.

Alternatively, ferroelectric materials, such as LiTaO$_3$ or PLZT, semiconductors, or organic materials may be used as substrates having electrooptic effect, and a dielectric having a lower dielectric constant than the substrate, such as Al$_2$O$_3$, ITO or polyimide, may be used as a buffer layer. Furthermore, the present invention, needless to say, can be applied not only to optical intensity modulators, but to optical control devices, such as optical phase modulators, optical switches or polarization controllers, which control optical output by use of electric signals.

As described above, the present invention is characterized by setting the width of the central electrode or strip electrode of the control electrodes to be larger than the core width $w_o$ of the optical waveguide, and preferably larger than the average of the core width $w_o$ and the ridge width $w_r$ of the optical waveguide, and more preferably still, larger than the ridge width $w_r$. These features prevent the device characteristics from becoming unstable due to changes in the dimensions of the central electrode, thus permitting the device to surpass the limits of the operating bandwidth that were present in conventional devices.

The present invention has been described in detail with respect to preferred embodiments, and it will now be clear that changes and modifications may be made without departing from the invention in its broader aspects, and it is our intention, therefore, in the appended claims to cover all such changes and modifications as fall within the true spirit of the invention.

What is claimed is:

1. An optical control devices, comprising:

a substrate having an electrooptic effect, said substrate additionally having ridges including optical waveguides;

a buffer layer on said substrate; and a plurality of electrodes on said buffer layer, said electrodes including at least one ground electrode and a central electrode formed over one of said ridges, wherein the surface of said buffer layer at portions other than said ridges is lower than the surface of said buffer layer on said ridges and wherein the width of said central electrode on the side where said central electrode contacts said buffer layer is larger than the width of said ridge.

2. The optical control device as claimed in claim 1, wherein immediately below said central electrode, the surface of said buffer layer is flat.

3. The optical control device as claimed in claim 1, wherein said central electrode is formed of a plurality of layers.

4. The optical control device as claimed in claim 3, wherein of said plurality of layers, the layer in contact with said buffer layer has a thickness of 1 µm or less.

5. The optical control device as claimed in claim 1, wherein said at least one ground electrode comprises a plurality of ground electrodes, and wherein a region without said buffer layer is provided between said central electrode and said ground electrodes.

6. The optical control device as claimed in claim 1, wherein said optical control device is a Mach-Zehnder type optical intensity modulator.

7. The optical control device as claimed in claim 1, wherein said substrate is comprised of LiNbO$_3$, LiTaO$_3$ or PLZT.

8. The optical control device as claimed in claim 1, wherein said electrodes are connected to an external circuit which has a characteristic impedance, and wherein said electrodes have an impedance that at least approximately matches said characteristic impedance of said external circuit.

9. An optical control device, comprising:

a substrate having an electrooptic effect, said substrate additionally having ridges including optical waveguides;

a buffer layer on said substrate; and a plurality of electrodes, said electrodes including a strip electrode on said buffer layer over one of said ridges, and a ground electrode formed on the back of said substrate, wherein the surface of said buffer layer at portions other than said ridges is lower than the surface of said buffer layer formed on said ridges, and wherein the width of said strip electrode on the side where said strip electrode contacts said buffer layer is larger than the width of said ridge.

10. The optical control device as claimed in claim 9, wherein immediately below said strip electrode, the surface of said buffer layer is flat.

11. The optical control device as claimed in claim 9, wherein said optical control device is a Mach-Zehnder type optical intensity modulator.

12. The optical control device as claimed in claim 9, wherein said substrate is comprised of LiNbO$_3$, LiTaO$_3$ or PLZT.

13. The optical control device as claimed in claim 9, wherein said electrodes are connected to an external circuit which has a characteristic impedance, and wherein said electrodes have an impedance that at least approximately matches said characteristic impedance of said external circuit.

14. An optical control device, comprising:

a substrate having a first ridge portion with a core to provide a first optical waveguide, the first ridge portion having a first ridge width, the substrate additionally having a second optical waveguide, the substrate comprising material with an electrooptic effect; and electrode means for electrically influencing the optical waveguides, the electrode means including at least one ground electrode and a signal electrode which is disposed over the first ridge portion, the signal electrode having a bottom surface and being wider at its bottom surface than the first ridge width.

15. The optical control device of claim 14, wherein the signal electrode comprises a plurality of electrode layers deposited one on top of the other.

16. The optical control device of claim 14, wherein the first ridge portion has a left side and a right side, and wherein the bottom surface of the signal electrode has a left edge that is located to the left of the left side of the first ridge portion and a right edge that is located to the right of the right side of the first ridge portion, so that the bottom surface of the signal electrode extends beyond both sides of the first ridge portion.

17. The optical control device of claim 14, further comprising a buffer layer which is disposed on at least the first ridge portion, the buffer layer having portions which coat the left and right sides of the first ridge portion, and wherein the bottom surface of the signal electrode extends beyond the portions of the buffer layer that coat both sides of the first ridge portion.

18. The optical control device of claim 14, wherein the second optical waveguide comprises a second ridge portion of the substrate, the second ridge portion having a side that is adjacent the first ridge portion, and wherein the at least one ground electrode comprises a first ground electrode which overlies the second ridge portion, the first ground electrode having a bottom surface with an edge that is adjacent the first ridge portion, the distance between the edge of the first ground electrode and the first ridge portion being smaller than the distance between the first ridge portion and the side of the second ridge portion that is adjacent the first ridge portion.

* * * * *